United States Patent
Paulsen et al.

(10) Patent No.: US 8,343,390 B2
(45) Date of Patent: *Jan. 1, 2013

(54) HIGHLY CRYSTALLINE LITHIUM TRANSITION METAL OXIDES

(75) Inventors: Jens Martin Paulsen, Cheonan (KR); Thomas Lau, Edmonton (CA); HeonPyo Hong, Cheonan (KR); JiHye Kim, Cheonan (KR)

(73) Assignee: Umicore, Brussels (BE)

( * ) Notice: Subject to any disclaimer, the term of this patent is extended or adjusted under 35 U.S.C. 154(b) by 0 days.

This patent is subject to a terminal disclaimer.

(21) Appl. No.: 13/057,202

(22) PCT Filed: Aug. 3, 2009

(86) PCT No.: PCT/EP2009/005600
§ 371 (c)(1),
(2), (4) Date: Apr. 25, 2011

(87) PCT Pub. No.: WO2010/015368
PCT Pub. Date: Feb. 11, 2010

(65) Prior Publication Data
US 2011/0193013 A1 Aug. 11, 2011

Related U.S. Application Data

(63) Continuation of application No. PCT/EP2008/006411, filed on Aug. 4, 2008.

(51) Int. Cl.
*H01B 1/08* (2006.01)
*C01G 45/00* (2006.01)
*C01G 51/00* (2006.01)
*C01G 23/00* (2006.01)

(52) U.S. Cl. .................. 252/521.2; 429/218.1; 429/223; 429/224; 429/231.95

(58) Field of Classification Search ............... 252/518.1, 252/519.4, 520.5, 521.2; 429/523, 218.1, 429/223, 224, 231.95; 423/179.5, 518
See application file for complete search history.

(56) References Cited

U.S. PATENT DOCUMENTS
4,302,518 A 11/1981 Goodenough et al.
(Continued)

FOREIGN PATENT DOCUMENTS
EP 1391950 2/2004
(Continued)

OTHER PUBLICATIONS

International Search Report, issued in PCT/EP2009/005600, dated Oct. 28, 2009.

*Primary Examiner* — Mark Kopec
(74) *Attorney, Agent, or Firm* — Brinks Hofer Gilson & Lione (57) ABSTRACT

A powderous lithium transition metal oxide having a layered crystal structure $Li_{1+a}M_{1-a}O_{2\pm b}M'_kS_m$ with $-0.03<a<0.06$, $b\cong0$, $0\leq m\leq0.6$, m being expressed in mol %, M being a transition metal compound, consisting of at least 95% of either one or more elements of the group Ni, Mn, Co and Ti; M' being present on the surface of the powderous oxide, and consisting of either one or more elements of the group Ca, Sr, Y, La, Ce and Zr, wherein: either k=0 and $M=Ni_{1-c-d}Mn_c CO_d$, with $0<c<1$, and $0<d<1$; or $0.015<k<0.15$, k being expressed in wt % of said lithium transition metal oxide; characterized in that for said powderous oxide, the X-ray diffraction peak at 44.5±0.3 degree, having as index 104, measured with K alpha radiation, has a FWHM value of $\leq0.1$ degree. By optimizing the sintering temperature of the metal oxide the FWHM value can be minimized.

13 Claims, 3 Drawing Sheets

U.S. PATENT DOCUMENTS

| | | | |
|---|---|---|---|
| 4,357,215 A | 11/1982 | Goodenough et al. | |
| 6,372,385 B1 | 4/2002 | Kweon et al. | |
| 7,736,806 B2 * | 6/2010 | Shimamura et al. | 429/220 |
| 2002/0142221 A1 | 10/2002 | Nemoto et al. | |
| 2002/0192552 A1 | 12/2002 | Lampe-Onnerud et al. | |
| 2003/0211396 A1 * | 11/2003 | Kobayashi et al. | 429/231.95 |
| 2006/0083989 A1 | 4/2006 | Suhara et al. | |
| 2006/0105239 A1 | 5/2006 | Paulsen et al. | |
| 2006/0127769 A1 | 6/2006 | Fujimoto et al. | |
| 2006/0263690 A1 | 11/2006 | Suhara et al. | |
| 2007/0099087 A1 | 5/2007 | Mihara et al. | |
| 2007/0122705 A1 | 5/2007 | Paulsen et al. | |
| 2010/0209771 A1 * | 8/2010 | Shizuka et al. | 429/207 |
| 2010/0227222 A1 * | 9/2010 | Chang et al. | 429/231.95 |

FOREIGN PATENT DOCUMENTS

| | | |
|---|---|---|
| JP | 3301931 | 7/1998 |
| JP | 11307097 | 11/1999 |
| JP | 2000200607 | 7/2000 |
| JP | 3653409 | 8/2000 |
| JP | 2002151154 | 5/2002 |
| KR | 20010002784 | 1/2001 |

* cited by examiner

HIGHLY CRYSTALLINE LITHIUM TRANSITION METAL OXIDES

CLAIM FOR PRIORITY

This application is a National Stage application of International Application No. PCT/EP2009/005600, filed Aug. 3, 2009, which is a continuation of International Patent Application No. PCT/EP2008/006411, filed Aug. 4, 2008, the entire contents of both of which are hereby incorporated herein by reference.

The invention relates to a powderous lithium transition metal oxide, used as active cathode material in rechargeable lithium batteries. More particularly, in Li(Mn—Ni—Co)O$_2$ type compounds higher crystallinity is obtained through a optimal selection of sintering temperature.

LiCoO$_2$ is still the most widely applied cathode material for rechargeable batteries. However, there exists a strong pressure to replace it by other materials for particular reasons. Currently, scarce resources of cobalt and fear of high prices accelerate this trend. Besides LiFePO$_4$ and Li—Mn-spinel, which both suffer from much lower energy density, LiNiO$_2$ based layered cathode materials and Li(Mn—Ni—Co)O$_2$ based layered cathode materials are the most likely candidates to replace LiCoO$_2$ in commercial battery applications. Today it is basically known that any composition Li[Li$_x$M$_{1-x}$]O$_2$ with M=Mn, Ni, Co within the quarternary system Li[Li$_{1/3}$Mn$_{2/3}$]O$_2$—LiCoO$_2$—LiNiO$_2$—LiNi$_{0.5}$Mn$_{0.5}$O$_2$ exists as a layered phase, and in most cases is electrochemically active.

It can be summarized that at the mid 90ties prior art were compositions within the Ni rich corner of the solid state solution between LiCoO$_2$—LiMn$_{1/2}$Ni$_{1/2}$O$_2$—{Li$_{1-x}$}NiO$_2$, including further dopants (like Al). The other corners LiCoO$_2$ and LiNi$_{1/2}$Mn$_{1/2}$O$_2$ were also known.

During the 90ties there was put little focus on the Li stoichiometry. So the patents above just claim LiMO$_2$, or a range of Li stoichiometries, but it has generally not been understood that the Li:M ratio is an important variable needing optimization. Li$_1$M$_1$ was typically seen as a desired stoichiometry which only can be obtained if a small lithium excess is used.

In the late 90ties slowly understanding of the role of excess Lithium evolved.

The first document which conclusively shows that additional lithium can be doped into LiMO$_2$ is JP2000-200607, claiming Li[Co$_{1-x}$M$_x$]O$_2$ and Li[Ni$_{1-x}$M$_x$]O$_2$ where M is at least 2 metals which have an average valence state of 3. Metals M include lithium, Mn, Co, Ni. Not surprisingly, within the next years several more publications regarding lithium rich (=Li[Li$_x$M$_{1-x}$]O$_2$) cathode materials were published. To our knowledge, the first disclosure of the possibility of excess lithium, doped into the crystal structure of LiMO$_2$ (M=Mn, Ni, Co) was JP11-307097, claiming Li$_{(1-a)}$Ni$_{1-b-c-d}$Mn$_b$Co$_c$M$_d$O$_2$ where −0.15<a<0.1, 0.02<b<0.45, 0<c<0.5 and 0≦d<0.2. The formula of claim 1 Li$_x$MO$_2$ (if x=1.05 Li$_{1.05}$MO$_2$) at first glance contradicts today's consent that it be better written as Li$_{1.025}$M$_{0.975}$O$_2$, i.e. there is a slight discrepancy between the oxygen stoichiometry, the first formula having a slightly lower (Li+M):O ratio. Both formulas describe the same material, and furthermore, none of them, describes the material completely accurate, simply because any "real" material possibly has a certain number of other disorder parameters like oxygen or cationic vacancies or interstitials, different composition on the surface etc.

Thus—1998 prior art can be defined as all solid solutions within the ternary system LiNiO$_2$—LiCoO$_2$—LiNi$_{1/2}$Mn$_{1/2}$O$_2$—Li[Li$_{1/3}$Mn$_{2/3}$]O$_2$.

Most of the hundreds of recent publications focus on compositions Li[Li$_x$M$_{1-x]O2}$ with M=Mn—Ni—Co, almost exclusively the Ni:Mn ratio is 1, and in many cases the compositions is either M=Mn$_{1/3}$Ni$_{1/3}$Co$_{1/3}$ or (Mn$_{1/2}$Ni$_{1/2}$)$_{1-x}$Co$_x$ with 0.1<x<0.2. It can be argued that there is a common consent that an excess of lithium (Li:M>1) is desired to obtain high rate.

Another issue is the shape of X-ray diffraction peaks. Sharp peaks with narrow FWHM (full width at half maximum) are related to high crystallinity. JP3653409 (Sanyo) claims a doped LiNiO$_2$ with FWHM of the main peak at 003 of 0.15-0.22 deg of 2 theta, using Cu—K alpha radiations.

JP3301931 (Sanyo) claims a doped (>1%) LiNi—Mn—Co oxide where the main 003 peak (at 18.71±0.25) has a FWHM<0.22 degree.

In EP1391950 A1 a composite oxide Li$_a$Mn$_{0.5-x}$Ni$_{0.5-y}$M$_{x+y}$O$_2$ is disclosed, with M being an element which is in a solid solution where it can displace Mn and Ni. Examples of M are B, Be, V, C, Si, P, Sc, Cu, Zn, Ga, Ge, As, Se, Sr, Mo, Pd, Ag, Cd, In, Sn, Sb, Te, Ba, Ta, W, Pb, Bi, Fe, Cr, Ti, Zr, Nb, Mg, Y, Al, Na, K, Mg, Ca, Co, Cs, La, Ce, Nd, Sm, Eu, and Tb. Preferably these oxides have a diffraction peak at a 2θ of 18.6+/−1° with a half width of from 0.05° to 0.20°, and also a peak at 44.1+/−1° having a half width of from 0.10° to 0.20°. The description only gives 2 examples of highly crystalline undoped LiMnNi Oxides having a half width of the peak at 44.1° of below 0.1°. All of the other oxides, like LiNiMnCo and LiMnNiMg oxides, are less crystalline, having half width values over 0.1°.

Despite of the impressive numbers of prior art—it is stilt not fully clear which compositions within the ternary triangle LiNiO$_2$—LiCoO$_2$—LiNi$_{1/2}$Mn$_{1/2}$O$_2$—Li[Li$_{1/3}$Mn$_{2/3}$]O$_2$ gives the best performance in terms of capacity and rate performance.

The overall development of cathode materials involves improving parameters which matter in the batteries. Some of the parameters are relatively easy to measure, like capacity, voltage profile and rate performance, which can be measured by making and testing coin cells. Other parameters are less obvious. So it is not fully clear how safety or swelling properties (e.g. of charged polymer batteries during storage at elevated temperature) can be measured, without assembling real batteries. There exists a strong indication that these safety and storage parameters are not only determined by the chemical composition of the cathode but also by surface properties. However, reliable previous art in this area is rare.

In this respect, the authors observed a problem that resides in the reaction of the surface of the active lithium transition metal oxide cathode material and the electrolyte in the battery, leading to poor storage properties and a decreased safety of the battery. The authors argue that lithium located near to the surface thermodynamically is less stable and goes into solution, but lithium in the bulk is thermodynamically stable and cannot go to dissolution. Thus a gradient of Li stability exists, between lower stability at the surface and higher stability in the bulk. By determining the "soluble base" content, based on the ion exchange reaction (LiMO$_2$+δH$^+$←→Li$_{1-δ}$HδMO$_2$+δLi$^+$), the Li gradient can be established. The extent of this reaction is a surface property.

To improve safety, aluminum doping of LiNiO$_2$ based cathodes, as well as Al, Mg—Ti or Ni—Ti doping of LiCoO$_2$ has been frequently disclosed, for example in JP2002-151154 (Al+Co doped LiNiO$_2$) or JP2000-200607 (doped LiCoO$_2$). Typical for doping is that the doped element fits to the host crystal structure, which limits doping of LiMO$_2$ more or less to transition metals, Li, Mg, Ti, Al, and maybe B. Several disclosures show anionic doping, like fluorine doping, phosphor doping or sulphur doping. It is however very questionable if these anions can replace oxygen because they differ in significantly in size or valence. It is more likely that they instead are present at the surface and grain boundaries as lithium salts. The lithium salts LiF, $Li_3PO_4$ and $Li_2SO_4$ all have high thermal stability which promotes a thermodynamic co-existence with the $LiMO_2$ phase.

In general doping is the modification of the bulk structure, whereas, for safety and storage properties, the surface chemistry is more important. Therefore, in many cases, the improvement of surface properties, is more than outweighed by the deterioration of bulk properties. Typical examples are the doping by aluminum, where better thermal stability often is accompanied by a dramatic decrease of power (rate performance).

An alternative approach, widely disclosed in the literature is coating. An early disclosure of a coated cathode was KR20010002784, where a $LiMO_2$ cathode (M=$Ni_{1-x}Co_x$) (or the sulphur or fluorine "doped" $LiMO_2$ cathode is coated with a metal oxide with metal selected from Al, Al, Mg, Sr, La, Ce, V and Ti and the stoichiometric amount of metal is at least 1%.

An alternative approach is the creation of core-shell cathode materials, or gradient type cathode materials. Here a thick and dense shell of a more robust cathode material protects a core of a more sensitive cathode material. Depending on sintering temperature and chemical composition, the final cathode has either a core-shell morphology or a gradient morphology. Typically both the shell and the core are electrochemically active (have reversible capacity).

Sulphate is an impurity of concern in layered lithium transition metal oxides. Sulphate typically originates from the mixed hydroxide precursors. This is because the mixed hydroxide preferably is precipitated from transition metal sulphate solution, which is the cheapest water soluble transition metal precursor. Complete removal of sulphur is difficult and increases the cost of the precursor. The sulphate impurity is suspected to cause (a) poor overcharge stability and (b) contribute to the highly undesired low Open Circuit Voltage (OCV) phenomena, where a certain fraction of batteries show a slow deterioration of OCV after initial charge. Sulphate impurities normally measured when using transition metal sulphate solutions in the manufacturing process can be up to 5 wt %.

It is an object of this invention to develop lithium transition metal oxide cathode materials having improved electrochemical properties, like capacity, voltage profile and rate performance; by improving the crystallinity of the cathode materials.

The invention discloses a powderous lithium transition metal oxide having a layered crystal structure $Li_{1+a}M_{1-a}O_{2\pm b}M'_k S_m$, with $-0.03<a<0.06$, $b\cong0$, $0\leq m\leq0.6$, m being expressed in mol %, M being a transition metal compound, consisting of at least 95% of either one or more elements of the group Ni, Mn, Co and Ti; M' being present on the surface of the powderous oxide, and consisting of either one or more elements of the group Ca, Sr, Y, La, Ce and Zr, wherein: either k=0 and M=$Ni_{1-c-d}Mn_cCo_d$, with $0<c<1$, and $0<d<1$; or $0.015<k<0.15$, k being expressed in wt % of said lithium transition metal oxide; and wherein the X-ray diffraction peak at 44.5±0.3 degree, having as index 104, measured with K alpha radiation, has a FWHM value of ≦0.1 degree. In one embodiment of the invention $0<k<0.15$ and M=$Ni_{1-c-d}Mn_cCo_d$, with $0<c<1$, and $0<d<1$; and more preferably c=d=0.333. The (Li+M):O ratio is with respect to the present invention preferably within a range of 0.99 to 1.01.

Preferably, the powderous lithium transition metal oxide has a X-ray diffraction peak at 18.6±0.2 degree, having as index 003, also with a FWHM value of 0.1 degree.

In another embodiment, $0.15<m\leq0.6$, m being expressed in mol %. Also preferably $0.0250<k\leq0.1$ in wt %. In a more preferred embodiments, when M' is Ca, $0.0250\leq k<0.0500$, and preferably $k\leq0.0400$, in wt %, and $0.25\leq m\leq0.6$, in mol %; when M' is Sr, $0.0300\leq k<0.1000$, and $0.25\leq m\leq0.6$, in mol %.

The invention also describes a process for improving the crystallinity of a powderous lithium transition metal oxide as described above, the metal oxide being obtained by sintering a M-hydroxide, -oxyhydroxide or -carbonate precursor together with a Li precursor, preferably $Li_2CO_3$, at a temperature T of at least 900° C., and preferably at least 950° C., for a time t between 1 and 48 hrs, with a value for $(1+a)/(1-a)$ between 0.99 and 1.1, and selecting the sintering temperature such that the X-ray diffraction peak of said lithium transition metal oxide at 44.5±0.3 degree, having as index 104, measured with K alpha radiation, has a FWHM value of ≦0.1 degree, or even <0.1 degree. Preferably also the sintering temperature is selected such that the X-ray diffraction peak of said lithium transition metal oxide at 18.6±0.2 degree, having as index 003, has a FWHM value of ≦0.1 degree, and more preferably ≦0.08°. In the examples it will be clarified that the process cannot be defined more precisely without duly restricting its scope, and also that it can be directly and positively verified by tests or procedures that are adequately specified when the result expressed in the process is achieved, and this without requiring undue effort in experimentation.

The invention also demonstrates that the surface properties, determining the safety and stability of cathodes in real batteries—the surface properties being measured as base content by pH titration—are strongly determined by the sulfur and the content of added elements of the group Ca, Sr, Y, La, Ce and Zr, and preferably Ca or Sr. The lithium transition metal oxides containing 0.15-0.6 mol % sulphur and 150-1500 ppm Calcium and strontium show reduced content of soluble base and an improved morphology, characterized by the absence of fine particles. As a result, the performance in rechargeable lithium batteries is improved.

The lithium transition metal oxide can be prepared by a cheap process, for example by a single firing of a mixture of a suitable precursor and lithium carbonate in air. Preferably the precursor is a mixed metal precursor like mixed hydroxide, oxyhydroxide or carbonate, already containing adequate amounts of sulphur and calcium.

Surface modified cathode materials are prepared in a single step. For the preferred compositions the precursors can be enriched by Ca to reach a concentration of Ca of preferably 200-500 ppm. These precursors are used to prepare surface modified LiMO by a single cook. If the Ca impurity level of the precursors is lower, then Ca can be added to the precursor, preferably in liquid form, by a technique which the authors call slurry doping. High surface area precursor (for example mixed hydroxide) is dispersed in as little as possible water (or any other solvent) to form a paste of high viscosity. During rigid stirring a dissolved calcium salt like $CaCl_2$ or $Ca(NO_3)_2$ is slowly added until the desired concentration is reached. During addition, and during the following drying, calcium precipitates well-dispersed onto the surface of the mixed hydroxide. Doping with the other preferred elements is performed in an analogous manner.

Alternatively the calcium can be added during the precursor preparation process. This is possible by adding a small concentration of calcium (typically less than 100 ppm) to the water used to dissolve the metal salt (for example $MSO_4$)

precursor or base (NaOH) precursor. Alternatively Ca can be added in higher concentration to the water used to wash the precursor after finished precipitation.

When a small amount of calcium, strontium, or the other M' metal is added to the metal salt, like $MSO_4$, some of it is trapped in the precipitated hydroxide. During the sintering step with $Li_2CO_3$ the lithium transition metal oxide crystallites form. Because e.g. Ca(2+) or Sr(2+) are too large to fit into the crystal structure there is a tendency to push them out during sintering. By their size Ca or Sr allow to stabilize the oxide surface, and as a result a mono or sub-monolayer forms of N is formed. In fact, when N, like Ca, is present on the surface of the crystallites, it acts as a sort of glue between grains.

The surface modification by calcium is possibly a catalytic de-activation of active surface sites, because (a) Calcium (or one of the other preferred elements) has a much larger ionic radius and cannot be doped into the bulk structure and (b) up to 1500 ppm Ca (or one of the other preferred elements) is simply not enough to form a coating layer. (Here the word coating is used in the conventional sense as a layer consisting of at least 10-100 atomic layers, corresponding to a few nm to about 100 nm thickness). The authors speculate that the mechanism of de-activation is related to a phenomenon known from catalyst technology as catalyst poisoning. During operation of a catalyst (for example platinum in a gas containing traces of sulphur species) trace amounts can de-activate the catalyst by covering catalytically active sites.

At least 150 ppm of the elements like Ca, Sr, Y, La, Ce and Zr, are needed to achieve the beneficial effect, if the level is much higher, especially >1500 ppm, then the electrochemical properties suffer, particularly the rate performance decreases and the irreversible capacity increases.

The inventors of the actual patent application discovered that sulphur levels of 0.2-0.6 wt % can be tolerated if at least 150 ppm of the elements like Ca, Sr, Y, La, Ce and Zr is present, and that 0.2-0.6 wt % of sulphate is harmful to the cathode performance if the Ca impurity is lower.

The invention is further explained by the following Examples and Figures. The Figures are summarized as follows.

EXAMPLE 1

High Crystallinity a) for $Li_{1+a}M_{1-a}O_{2\pm b}M'_kS_m$ with k, m=0 and $M=Ni_{1-c-d}Mn_cCo_d$.

A hydroxide MOOH with $M=Ni_{0.53}Mn_{0.263}Co_{0.2}$ was used as precursor. Samples were prepared at 920° C., 940° C., 960° C. and at 967° C. As expected, the BET surface area decreased with increasing temperature. The Li:M was basically identical (all samples had identical unit cell volume). The electrochemical performance improved with temperature, having the best performance at approx. 960-970° C. sintering temperature.

Figure 1:
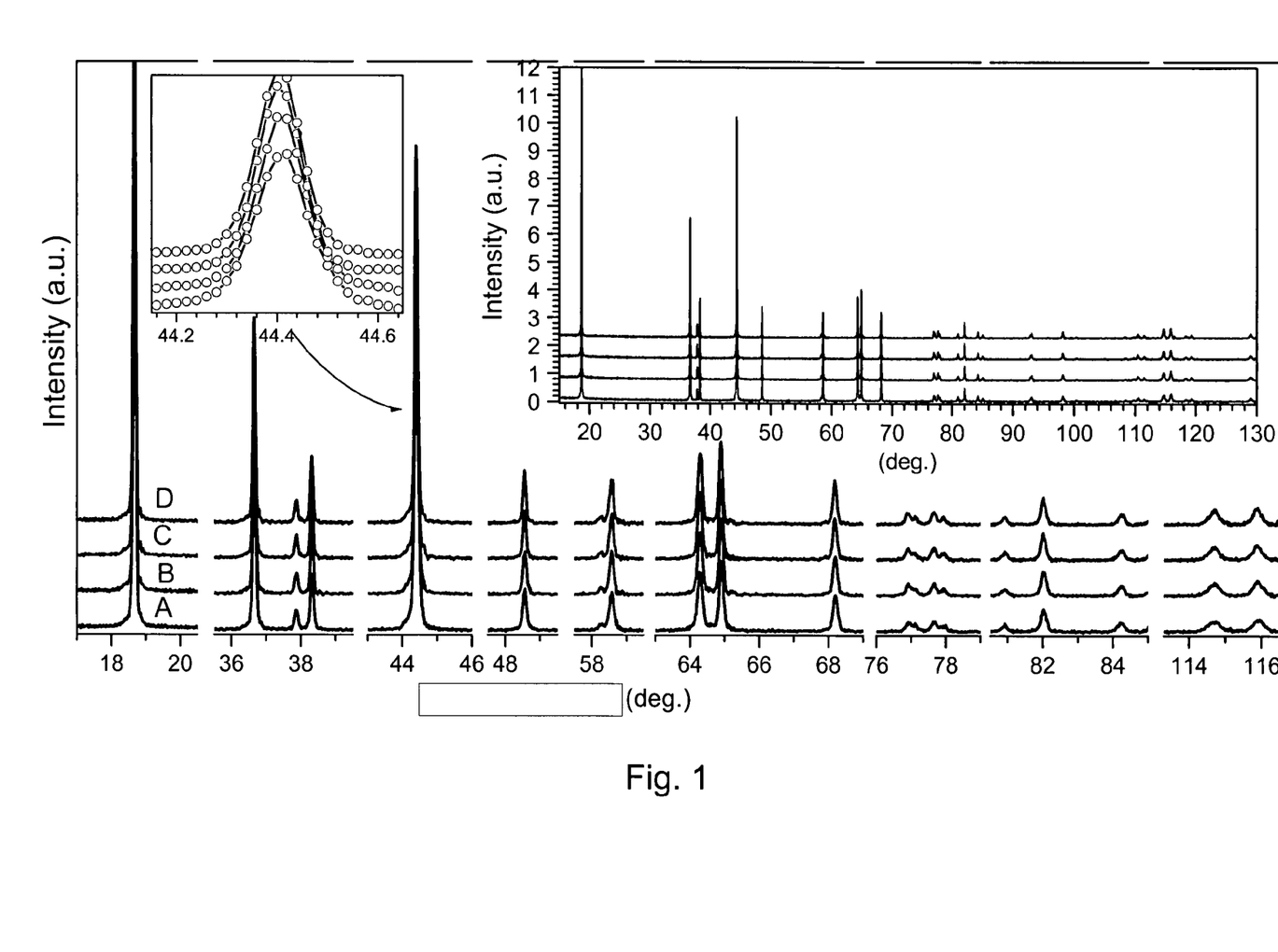
FIG. 1: X-ray diffraction pattern at different sintering temperatures

FIG. 1 shows the X-ray diffraction pattern of the 4 samples: the sintering temperatures of the samples A-D can be found in Table 1 below. The FWHM (full width at half maximum) vs. scattering angle (deg.) is shown for the (single) peaks 101, 006, 102, 104, 105, 110, 108, 113, the FWHM values being determined as explained below. The 003 peak was excluded because it typically shows asymmetry which is not fitted very well. Peaks at >70 degree were not fitted because of smaller resolution.

Figure 2:
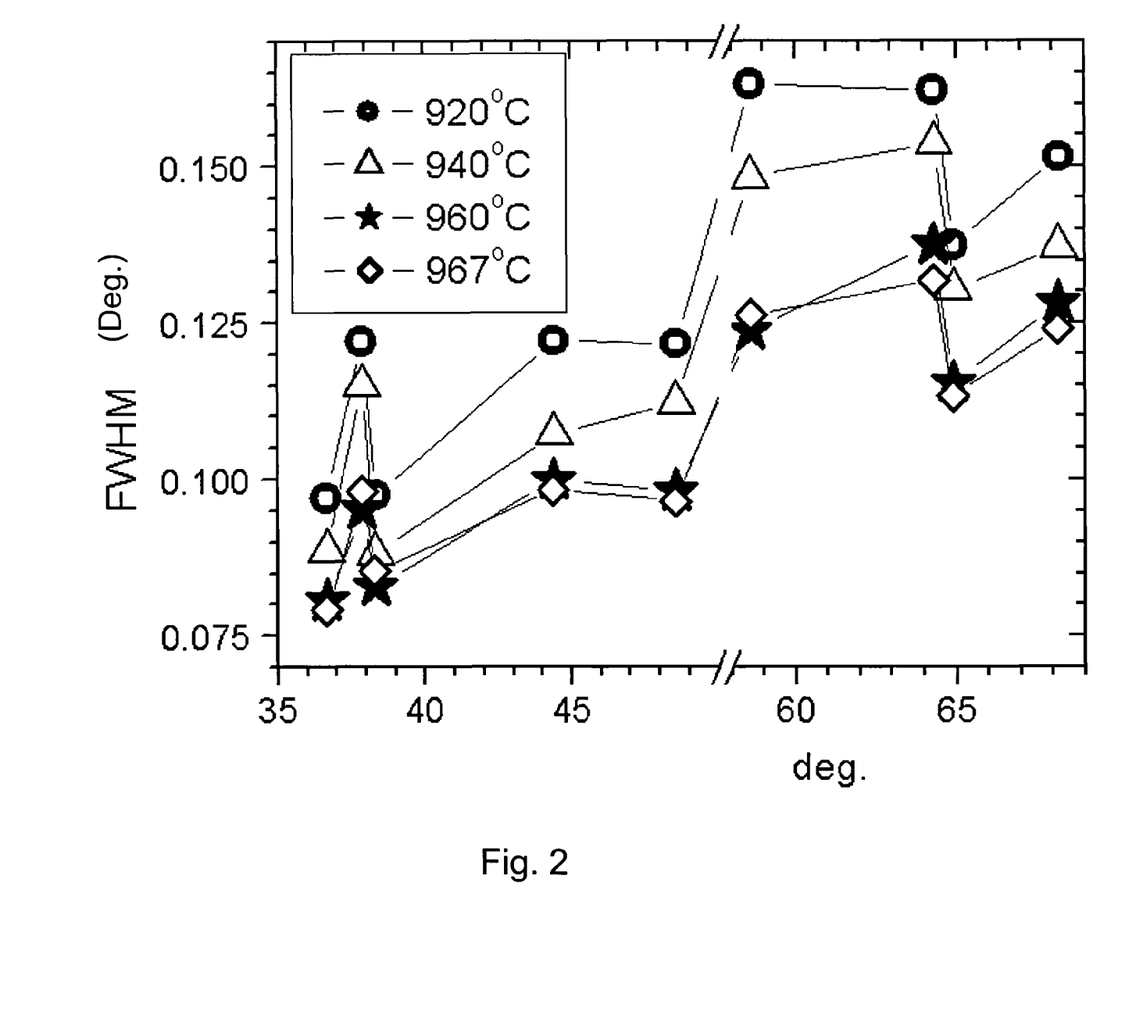
FIG. 2: FWHM as function of scattering angle

FIG. 2 shows the evolution of FWHM (left and right) as function of scattering angle (deg.) for the samples prepared at different temperatures from Table 1. Clearly, the FWHM decreases with increasing sintering temperature. The experimental results are summarized in Table 1.

Figure 3:
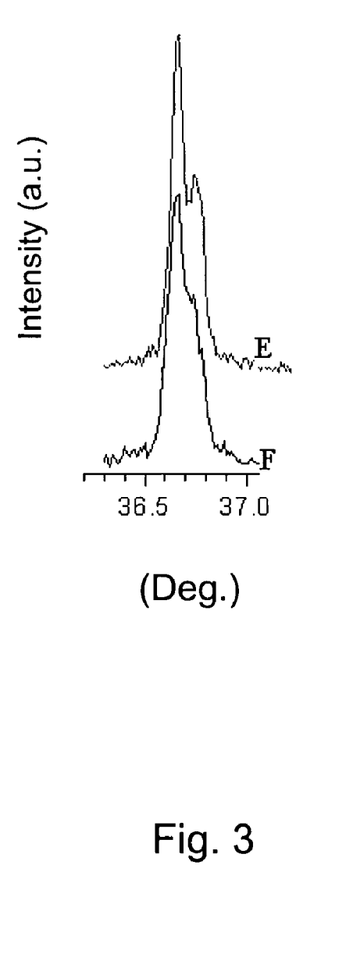
FIG. 3: X-ray diffraction pattern with detailed peak separation

FIG. 3 gives an additional example of two X-ray diffraction patterns of a Li-M-oxide with $M=Ni_{0.53}Mn_{0.263}Co_{0.2}$: sample E is according to the invention, while sample F is not. Note that the figure shows an X-ray diffraction pattern before filtering, i.e. with both the Cu $K\alpha 1$ and the $K\alpha 2$ responses as explained below with respect to the proper determination of the FWHD.

TABLE 1

Results for Li-M-oxide with $M = Ni_{0.53}Mn_{0.263}Co_{0.2}$ - optimum crystallinity

| Sample | Sinter T (° C.) | BET (m²/g) | Vol (Å³) | Size (nm) | Strain (G) | Q (mAh/g) | Qirr (%) | FWHM 104 | FWHM 113 |
|---|---|---|---|---|---|---|---|---|---|
| A | 920 | 0.57 | 33.897 | 232 | 0.189 | 165.7 | 13.6 | 0.1222 | 0.1515 |
| B | 940 | 0.49 | 33.904 | 282 | 0.167 | 168.8 | 12.2 | 0.1072 | 0.1371 |
| C | 960 | 0.40 | 33.906 | 327 | 0.15 | 169.5 | 11.7 | 0.1000 | 0.1283 |
| D | 967 | 0.37 | 33.902 | 329 | 0.15 | 169.4 | 11.8 | 0.0984 | 0.1241 |

In Table 1, "Vol" stands for the unit cell volume per formula unit obtained by a Rietveld refinement of high resolution X-ray diffraction pattern (15-135 degree of 2 theta, 6 h measurement time). The unit cell volume is a very sensitive measure of the Li:M ratio. The refinement furthermore delivered the parameter for the "Size", together with the "Strain, which are a measure of the crystallinity of the sample. The larger the size and the smaller the strain, the better the crystallinity. The parameter "Q" corresponds to the specific capacity of the material using coin cells, measured between 4.3 and 3.0 V at a rate of 0.1 C. "Qirr" is the irreversible capacity, defined as Qcharge minus QDischarge, divided by Qcharge.

The FWHM (full width at half maximum) values were determined as follows.

The Xray powder diffraction pattern was collected using a Rigaku D/Max 2000 diffractometer with theta—two theta geometry and Cu radiation. A relatively narrow receiving slit (0.15 mm) was selected to limit the peak broadening contribution caused by the instrument. The divergence slit was 1 degree. It should be noted that the intrinsic FWHM of the powder, i.e. the peak width caused by the crystallinity of the sample itself, is slightly less than that measured width, which always also includes some contribution from the instrument. The here reported and claimed FWHM values correspond to the values as measured with state of the art apparatus.

The Xray diffraction pattern contains two contributions, the main one being caused by the $K\alpha 1$ radiation, and a secondary one, which has a lower intensity, by the Kα2 radiation. Obtaining a reliable FWHM requires to remove the Kα2 part from the diffraction pattern. This was achieved using the software "Jade", resulting in a pure Kα1 Kat Xray powder diffraction pattern.

To assess the crystallinity, two single peaks with good intensity, not overlapping with other peaks, were chosen. These peaks are the 104 peak at about 44.5° and the 113 peak at about 68°. We hereby use the hexagonal notation of the rhombohedral space group R-3m in the naming convention. The peaks are fitted by the Origin 8 software, using a Lorentz function. The Lorentz FWHM is listed in the tables.

The results show that, with increasing crystallinity (larger size and smaller strain, less FWHM) the electrochemical performance improves until it saturates at a size of 330 nm. Samples with a sufficient degree of crystallinity have a FWHM of the 104 peak (which, besides the 003, is the peak with the highest intensity) below 0.1 degree. The 003 peak has a FWHM of less than 0.08 degree.

b) for $Li_{1+a}M_{1-a}O_{2\pm b}M'_kS_m$ with $0.015 < k < 0.15$, $0.15 < m \leq 0.6$.

Two batches of undoped MOOH hydroxide precursors were prepared, both with a composition according to $M=Ni_{0.5}Mn_{0.3}Co_{0.2}$. These precursors had a tap density of respectively 1.63 g/cm$^3$ and 2.03 g/cm$^3$, and a D50 of the particle size distribution of about 10 μm. Impurities were sulfate, respectively 0.15 wt % and 0.5 wt %, all other impurities (Na, Ca) being below 150 ppm. The samples derived from these two batches are denominated as series A and series B in Tables 1' and 1''.

Both batches were then doped with Sr, according to the following process. Strontium nitrate was dissolved in water so as to obtain a 0.2 molar solution. About 1.5 kg of precursor was immersed into a stirred reactor, and an appropriate amount of ethanol was added, resulting in a relatively viscous slurry. During continued stirring, 68.5 ml of the strontium solution was slowly added. The reactor was closed, and the slurry heated to 60° C. Evaporating ethanol was removed from the reactor using a diaphragm pump. The stirring continued until the slurry became too dry for stirring. The dry cake was then sieved using a 53 μm mesh. The so obtained Sr modified precursor contained 800 ppm of Sr.

After this treatment, and compared with an untreated sample, no obvious changes of morphology could be demonstrated by either SEM or particle size analysis. In particular, no agglomerates containing larger Sr-salt crystals could be detected.

The final products were then prepared by blending with $Li_2CO_3$ and sintering. To this end, 1 kg blends of $Li_2CO_3$ and Sr containing MOOH were prepared using a Turbula mixer. The ratio of Li:M was approximately 1.03. Test samples were sintered at 950° C. and checked by Xray analysis. They showed lattice constants corresponding to a unit cell volume of 33.95 Å$^3$, i.e. within a preferred region.

Each actual samples was prepared from ca. 200 g of blended powders. The firings were performed from 880° C. to 960° C., in a flow of air, for about 24 h, heating and cooling times included. After sintering, the samples were sieved using a 53 μm mesh. The final Sr containing Li-M-O$_2$ products were subjected to Xray analysis, Rietveld refinement, pH titration, coin cell testing, chemical analysis, and SEM.

Tables 1' and 1'' summarize the results obtained with the strontium containing samples from series A and B, as a function of the sintering temperature. The "Q" and "Rate" parameters were measured using coin cells. "Q" is the specific capacity measured at a discharge rate of 0.1 C, while "Rate" is a measure of the high rate discharge behavior, reported as the ratio of the 2 C capacity to the 0.1 C capacity. The FWHM values were measured according to the procedure of Example 1a. The base content and BET surface area decrease with increasing sintering temperature. Since low base content and low BET are desired, a narrow FWHM is preferred. It is indeed assumed that a high BET increases the area where unwanted reactions between electrolyte and charged cathode can take place, thus causing poor safety performance, whereas a high base content is known to lower the high temperature storage properties.

Performances thus appear to be excellent for the samples showing a 104 peak with a FWHM of 0.1° or less. Also, a FWHM of 0.08 or more seems desirable for this peak. This is valid for both the undoped (Example 1a) and the Sr-doped (Example 1b) samples.

TABLE 1'

Series A samples, preparation conditions and evaluation

| Sample | Sinter T (° C.) | FWHM 104 (°) | FWHM 113 (°) | Q (mAh/g) | Rate (%) | BET (m$^2$/g) | Base (μmol/g) |
|---|---|---|---|---|---|---|---|
| EX0274 | 880 | 0.139 | 0.216 | 157.26 | 82.3 | 0.746 | 61 |
| EX0275 | 900 | 0.125 | 0.190 | 160.38 | 84.68 | 0.633 | 52.9 |
| EX0276 | 920 | 0.116 | 0.159 | 162.52 | 86.67 | 0.517 | 43.9 |
| EX0277 | 940 | 0.101 | 0.133 | 164.03 | 84.35 | 0.412 | 41.2 |
| EX0293 | 945 | 0.095 | 0.114 | 164.37 | 85.61 |  | 40.5 |
| EX0278 | 960 | 0.088 | 0.101 | 159.13 | 82.16 | 0.301 | 36.2 |

TABLE 1'''

Series B samples, preparation conditions and evaluation

| Sample | Sinter T (° C.) | FWHM 104 (°) | FWHM 113 (°) | Q (mAh/g) | Rate (%) | BET (m$^2$/g) | Base (μmol/g) |
|---|---|---|---|---|---|---|---|
| EX0279 | 880 | 0.153 | 0.238 | 160.18 | 85.33 | 0.428 | 82 |
| EX0280 | 900 | 0.128 | 0.208 | 162.67 | 86.81 | 0.377 | 76.3 |
| EX0281 | 920 | 0.114 | 0.172 | 165.64 | 87.15 | 0.372 | 70.6 |
| EX0282 | 940 | 0.105 | 0.149 | 167.9 | 87.05 | 0.344 | 60.3 |
| EX0294 | 950 | 0.095 | 0.141 | 167.77 | 87.66 |  | 56.1 |
| EX0283 | 960 | 0.083 | 0.116 | 165.46 | 85.3 | 0.290 | 48.2 |

EXAMPLE 2

Improved Safety and Lower Base of Ca Containing Cathode 2 cathode materials MP1 and MP2 with composition $Li_{1+a}M_{1-a}O_{2\pm b}Ca_kS_m$ were produced at large scale (several tons) from mixed transition metal hydroxide, which contained different amounts of Ca and sulfur. In both cases the stoichiometry was very similar (a=0.05, M=$Mn_{1/3}Ni_{1/3}Co_{1/3}$, m≅0.4 mol %) but the level of Ca was different: MP1 had 393 ppm Ca, whereas MP2 had a normal impurity level of 120 ppm Ca (normally more than 50 but less than 150 ppm are found). Other properties (lithium stoichiometry, particle size, BET surface area, X-ray diffraction pattern were basically similar.

The content of soluble base was measured as follows: 100 ml of de-ionized water is added to 7.5 g of cathode, followed by stirring for 8 minutes. Settling-down is allowed for typically 3 minutes, then the solution is removed and passed through a 1 μm syringe filter, thereby achieving >90 g of a clear solution which contains the soluble base.

The content of soluble base is titrated by logging the pH profile during addition of 0.1 M HCl at a rate of 0.5 ml/min until the pH reaches 3 under stirring. A reference pH profile is obtained by titrating suitable mixtures of LiOH and $Li_2CO_3$ dissolved in low concentration in DI water. In almost all cases two distinct plateaus are observed. The upper plateau is $OH^-$/$H_2O$ followed by $CO_3^{2-}$/$HCO_3^-$, the lower plateau is $HCO_3^-$/$H_2CO_3$. The inflection point between the first and second plateau as well as the inflection point after the second plateau is obtained from the corresponding minima of the derivative d pH/d Vol of the pH profile. The second inflection point generally is near to pH 4.7. Results are listed as micromole of base per g of cathode.

The amount of base which goes into solution is very reproducible, and is directly related to surface properties of the cathode. Since these have a significant influence on the stability (i.e. safety and overcharge/high T storage properties of the final battery) there is a correlation between base content and stability.

Tables 1A and 1B summarize the results.

normal operating voltage (for example 20V) is reached. In many cases during such a test more lithium is extracted from the cathode than can be inserted to the anode, so the dangerous effect of lithium plating occurs. At the same time the highly delithiated cathode is in a highly reactive state, and ohmic (resistive) heat is generated. The heat can initiate the dramatic thermal run-away reaction, ultimately leading to the explosion of the battery. Whether a battery passes such a test (i.e. does not explode) or not is strongly dependent on the choice of cathode material, its morphology, impurity levels and its surface chemistry. Very little fundamental scientific understanding exists, but the presence of fine particles definitively contributes to poor safety.

Conclusion: The higher content of Ca caused lower soluble base content and higher safety.

Example 2 showed that a Ca content of approx. 250-400 ppm effectively lowered the base content and improved the safety of the cathode. If we now estimate the number of atomic layers on top of the surface of the cathode, assuming that a) all of the calcium is located at the surface of the cathode particles,
b) the surface area of the cathode is reliably obtained by 5 point BET measurement using nitrogen,
c) Calcium is evenly distributed on the surface,
d) the average distance between Ca atoms is the same as in CaO;

then it can be concluded that the effect of Ca is rather a catalytic effect (less than a few one atomic layer) and not caused by a conventional coating effect (many layers of atoms).

TABLE 1A

Properties of sample MP1 and MP2

| Sample | Li % wt | Ni % wt | Mn % wt | Ca ppm | S % wt | Co % wt | PSD (μm) | | | TapD g/cm³ | BET m²/g |
|---|---|---|---|---|---|---|---|---|---|---|---|
| | | | | | | | D10 | D50 | D90 | | |
| MP1 | 7.568 | 19.573 | 18.625 | 393 | 0.087 | 19.441 | 4.3 | 6.9 | 10.8 | 2.07 | 0.42 |
| MP2 | 7.523 | 19.733 | 18.439 | 120 | 0.148 | 19.707 | 3.7 | 6.4 | 10.5 | 2.09 | 0.44 |

TapD: tap density

TABLE 1B

Properties of sample MP1 and MP2

| Sample | Unit cell (X-ray) | | | Soluble Base | Qrev 4.3-3.0 V | Qirr % | Rate versus 0.1 C % | | | Safety Over charge |
|---|---|---|---|---|---|---|---|---|---|---|
| | a (Å) | c (Å) | Vol, ų | μmol/g | mAh/g | | 3 C | 2 C | 3 C | |
| MP1 | 2.8590 | 14.2327 | 33.584 | 25.9 | 155.0 | 11.8 | 86.0 | 89.1 | 86.0 | Pass |
| MP2 | 2.8594 | 14.2337 | 33.595 | 51.2 | 156.3 | 10.9 | 86.6 | 89.1 | 86.6 | Fail |

The samples are very similar, with one exception: the soluble base content of sample MP1 (with high Ca) was significantly lower than for MP2. Other properties are very similar, and although MP2 (with low Ca) shows slightly higher capacity, slightly lower irreversible capacity and slightly higher rate performance, the results for MP1 are still acceptable. More important, the samples MP1 and MP2 were sent to battery producer for safety testing. Whereas MP1 passed the safety test, MP2 did not pass.

The "Safety overcharge test" used here is a safety test where a battery is charged at a very high rate (for example with 1C charge rate) until a much higher voltage than the

EXAMPLE 3

Optimization of Ca and Sulfur Additions

This Example serves to demonstrate 2 aspects of the invention:

(1) it confirms the observation of Example 2 that Ca "neutralizes" the negative effect of a high soluble base content of sulfur containing cathodes, and (2) it demonstrates that only samples which contain both sulfur and calcium according to the invention show good overall performance.

The Example uses a mixed transition metal hydroxide precursor with metal composition M=$Mn_{1/3}Ni_{1/3}Co_{1/3}$. The precursors naturally are low in Ca but contain some sulfur. The sulfur is removed after preparation of a preliminary Li-M-Oxide sample (Li:M=1.1) by washing. Then the preliminary sample is used as precursor, and the following matrix is prepared:
(6a): no addition of sulfur nor calcium
(6b): addition of 400 ppm Ca
(6c): addition of 0.5 wt % $SO_4$
(6d): addition of both 400 ppm Ca and 0.5 wt % $SO_4$,
followed by a re-sintering. Final samples with the same morphology but different Ca, S composition are obtained. The addition of Ca and/or S is performed by slurry doping of the Li-M-oxide preliminary sample. Slurry doping is the dropwise addition of a $Li_2SO_4$ solution or of a $Ca(NO_3)_2$ solution during stirring of a preliminary sample powder-in-water slurry of high viscosity, followed by drying in air. A total of 400 ppm Ca or 5000 ppm ($SO_4$) sulfur was added. Note that 1000 ppm of sulfate generally corresponds to approx. 0.1 mol % of sulfur, more accurate—for $Li_{1.04}M_{0.96}O_2$ 1000 ppm correspond to 0.105 mol %. The experiment was repeated for a precursor with M=$Ni_{0.53}Mn_{0.27}Co_{0.2}$ composition, where the preliminary sample—the precursor during slurry doping—was prepared using a Li:M=1.02 blend ratio.

Electrochemical properties are tested, and settling down kinetics are measured. The sample without added Ca showed the highly undesired fine particles which do not settle down. All samples with Ca settled down very fast.

Of all samples—only the sample which contains Ca and sulfur show overall good performances, as can be seen in Tables 2A and 2B.

Samples situated outside the claimed concentrations (either too high or too low) show the following disadvantages:
Low Ca & low SO4→unacceptable level of fine particles
Low Ca and high SO4→high soluble base content, fine particles
High Ca and low SO4→relatively poor electrochemical performances.

Note that in this test (2B) some of the added $SO_4$ was lost due to crystallisation.

As a result of Examples 2 and 3 the following Table 2C gives an overview of the addition of Ca and S.

TABLE 2C

Overview

| | Low Sulfur | Sulfur: 0.15-0.6 mol % | High Sulfur |
|---|---|---|---|
| Low Calcium | too many fine particles | high soluble base content - too many fine particles | very high soluble base content - too many fine particles |
| Calcium: 150-1500 ppm | poor electrochemical properties | good electrochemical properties - low soluble base content | high soluble base content |
| High Calcium | very poor electrochemical properties | poor electrochemical properties | poor electrochemical properties |

EXAMPLE 4

Comparison of Identical Morphology with High/Low Ca Content

A sample EX10A (1 kg size) is prepared from a mass scale production precursor mixed hydroxide with metal composition $Mn_{1/3}Ni_{1/3}Co_{1/3}$ by mixing the precursor with $Li_2CO_3$ (blend ratio 1.1) followed by heating to 960° C. EX10B is prepared in the same way, with the exception that the precursor was modified by the previously described slurry doping: A total of 400 ppm Ca was slowly (drop wise) added in the form of $Ca(NO_3)_2$ to a water based slurry of the precursor, followed by drying (no filtering).

Table 3A and 3B summarize the results

TABLE 2A

Slurry doped $LiMn_{1/3}Ni_{1/3}Co_{1/3}O_2$

| Slurry doping: Li-M-$O_2$ M = $Mn_{1/3}Ni_{1/3}Co_{1/3}$ Addition of | BET $m^2/g$ | Ca ppm | $SO_4$ (wt %) | Base µmol/g | Q DC 3.0-4.3 V mAh/g | Q irr (%) | Rate @ 2 C (%) |
|---|---|---|---|---|---|---|---|
| (6a) Nothing | 0.41 | 150 | 0.180 | 26.9 | 157.5 | 10.95 | 89.08 |
| (6b) 400 ppm Ca | 0.41 | 500 | 0.182 | 20.8 | 156.3 | 11.53 | 88.24 |
| (6c) 0.5 wt % $SO_4$ | 0.44 | 150 | 0.620 | 31.0 | 157.8 | 10.65 | 88.84 |
| (6d) 400 ppm Ca, 0.5 wt % $SO_4$ | 0.45 | 510 | 0.630 | 23.3 | 156.4 | 11.02 | 88.80 |

TABLE 2B

Slurry doped $LiNi_{0.53}Mn_{0.27}Co_{0.2}O_2$

| Slurry doping: Li-M-$O_2$ M = $Ni_{0.53}Mn_{0.27}Co_{0.2}$ Addition of | BET $m^2/g$ | Ca ppm | $SO_4$ (wt %) | Base µmol/g | Q DC 3.0-4.3 V mAh/g | Q irr (%) | Rate @ 2 C (%) |
|---|---|---|---|---|---|---|---|
| (6a) Nothing | 0.3 | 120 | 0.095 | 37.8 | 169.1 | 12.76 | 87.10 |
| (6b) 400 ppm Ca | 0.32 | 430 | 0.087 | 27.0 | 166.6 | 13.79 | 86.83 |
| (6c) 0.5 wt % $SO_4$ | 0.36 | 110 | 0.25 | 58.1 | 169.6 | 11.84 | 87.39 |
| (6d) 400 ppm Ca, 0.5 wt % $SO_4$ | 0.33 | 440 | 0.28 | 49.4 | 168.1 | 12.75 | 87.82 |

TABLE 3A

| Sample | Ca ppm | BET $m^2/g$ | PSD D10 | PSD D50 | PSD D90 | a hex Å | c hex Å | Vol $Å^3$ | size nm |
|---|---|---|---|---|---|---|---|---|---|
| EX10A | 140 | 0.43 | 3.79 | 5.925 | 9.08 | 2.8590 | 14.2259 | 33.567 | 281 |
| EX10B | 420 | 0.42 | 3.78 | 5.914 | 9.07 | 2.8593 | 14.2316 | 33.588 | 254 |

TABLE 3B

| | Qrev 4.3-3.0 V | | Rate versus 0.1C (%) | | | Base |
|---|---|---|---|---|---|---|
| Sample | mAh/g | Qirr % | 1C | 2C | 3C | µmol/g |
| EX10A | 154.9 | 10.39 | 92.85 | 89.14 | 85.33 | 39.6 |
| EX10B | 153.8 | 11.71 | 92.61 | 88.99 | 86.05 | 26.5 |

As Tables 3A and 3B show, besides of the Ca impurity level, all 3 samples are, as expected for samples prepared under similar conditions from the same precursor, very similar. The PSD, obtained by laser diffraction are identical. Similar as observed in previous examples—the sample with Ca addition shows the smallest content of soluble base.

EXAMPLE 5

Alternative Elements Besides Ca

This example uses a mixed transition metal hydroxide precursor with metal composition $M1=Mn_{0.33}Ni_{0.38}Co_{0.29}$ as precursor. The precursor is low in Ca but contain some sulfur. A similar experiment is done with a mixed hydroxide precursor with $M2=Ni_{0.53}Ni_{0.27}Co_{0.2}$ composition.

The precursors are doped by slurry doping: 1000 ppm of nitrate solutions of Ca, Y, Sr, La, Ba, Fe are added, respectively. A reference was slurry doped but no metal was added. After slurry doping the precursors were mixed with $Li_2CO_3$ and cooked. Besides of the doping, final composition (Li, Mn, Ni, Co) was very similar.

To compare the efficiency to lower the base content the following parameters are considered:
 (a) Soluble base content (=soluble base/mass of cathode)
 (b) Specific surface base (=soluble base content/surface area of cathode)
 (c) Molar efficiency of dopant (µmol) versus gravimetric efficiency of dopant (ppm)

The results are summarized in Tables 4A (M1) and 4B (M2) below.

TABLE 4A

Efficiency of Ca, Y, Ba, Sr, La for Li-M-oxide with M = $Mn_{0.33}Ni_{0.38}Co_{0.29}$

| $Mn_{0.33}Ni_{0.38}Co_{0.29}$ | Slurry doping by | BET $m^2/g$ | Base µmol/g | Spec Surf Base µmol/$m^2$ | Rel % spec base | Unit cell X ray |
|---|---|---|---|---|---|---|
| LNMnCD0548 | Ref. 0 ppm | 0.52 | 51.3 | 98.7 | 100.0 | 33.702 |
| LNMnCD0549 | Ba, 1000 ppm | 0.45 | 44.1 | 98.0 | 99.3 | 33.705 |
| LNMnCD0550 | Ca, 1000 ppm | 0.50 | 30.5 | 61.0 | 61.8 | 33.718 |
| LNMnCD0551 | La, 1000 ppm | 0.54 | 50.5 | 93.5 | 94.8 | 33.703 |
| LNMnCD0552 | Sr, 1000 ppm | 0.42 | 35.1 | 83.6 | 84.7 | 33.713 |
| LNMnCD0553 | Y, 1000 ppm | 0.54 | 41.8 | 77.4 | 78.5 | 33.713 |

TABLE 4B

Comparison of the efficiency of Ca, Y, Ba, Sr, La for Li-M-oxide with M = $Ni_{0.53}Ni_{0.27}Co_{0.2}$

| $Ni_{0.53}Mn_{0.27}Co_{0.2}$ | Slurry doping by | BET $m^2/g$ | Base µmol/g | Spec Surf Base µmol/$m^2$ | Rel % spec base | Unit cell X ray |
|---|---|---|---|---|---|---|
| MLMOx0132 | Ref. 0 ppm | 0.38 | 74.7 | 196.6 | 100.0 | 33.889 |
| MLMOx0127 | Ca, 1000 ppm | 0.34 | 51.0 | 150.0 | 76.3 | 33.880 |
| MLMOx0128 | Sr, 1000 ppm | 0.27 | 47.9 | 177.4 | 90.2 | 33.869 |
| MLMOx0129 | Ba, 1000 ppm | 0.32 | 64.1 | 200.3 | 101.9 | 33.861 |
| MLMOx0130 | La, 1000 ppm | 0.37 | 70.4 | 190.3 | 96.8 | 33.862 |
| MLMOx0131 | Y, 1000 ppm | 0.38 | 64.5 | 169.7 | 86.3 | 33.874 |

The conclusions are as follows:
(a) Base content: Sr and Ca, and to a lesser degree Y and Ba are most efficient to lower the soluble base content.
(b) The final samples have different BET area, hence the "Specific Surface Base Content" is observed: Ca, Sr and Y, and to a lesser degree La lower the specific surface base content of the cathode.
(c) Gravimetric efficiency: Sr and Ca are the most efficient. Molar efficiency: Considering the high molecular weight of Y (more than twice that of Ca) we conclude that both Ca and Y are most efficient to neutralize high base caused by sulfur. Sr is somewhat less effective and La shows noticeable, but small efficiency. Ba is not effective, as can be seen in the "Specific Surface Base Content". Fe is inert (not reported).

The authors speculate that the effective elements have an ionic radius of 0.7-1.2 Angstrom. Especially Ca and Y—which have almost similar and quite small ionic radius (in 6 coordination Ca: 0.99, Y: 0.893 Å)—have a size that fits very well to the surface of Li-M-oxide. The more preferred range for ionic radii is 0.85-1.15 Angstrom.

EXAMPLE 6

Strontium Versus Calcium

Example 5 compared the efficiency of Ca, Sr, La, Ba, Y to lower the content of soluble base.

However, Example 5 did not take into account that the sintering kinetics change with different additives—yielding very different BET values. Example 6 compares the effect of Ca and Sr more carefully.

A reference without addition of additive (Ca or Sr) was prepared from a mixture of mixed transition metal hydroxide (M=$Ni_{0.38}Mn_{0.33}Co_{0.28}$) and $Li_2CO_3$ at 980° C. Further samples with addition of 400 and 1000 ppm Sr and 400 ppm Ca were prepared. Each sample used 1 kg of MOOH+ $Li_2CO_3$. The additive (Ca, Sr) was added by the previously described "slurry doping" process. Appropriate amounts of solution of $Sr(NO_3)_2$ and $Ca(NO_3)_2$ were added to a high viscous slurry of the precursor hydroxide during rigid stirring.

The sintering temperature was adjusted to achieve a similar sintering. Base content was measured, unit cell volume and crystallite size was obtained from X-ray diffraction and electrochemical properties were tested by coin cells. Tables 5A and 5B summarizes the preparation conditions results

TABLE 5B

Electrochemical performance (capacity, irreversible capacity and rate (versus 0.1C) of samples with Sr, Ca addition

| $Ni_{0.38}Mn_{0.33}Co_{0.28}$ | Q rev 4.3-3.0 V | Q irr % | 1C % | 2C % | 3C % |
|---|---|---|---|---|---|
| LNMnCD0555 | 161.9 | 11.1 | 91.8 | 88.4 | 85.1 |
| MLMOx0149 | 161.5 | 11.3 | 92.7 | 89.1 | 86.4 |
| MLMOx0150 | 159.8 | 11.8 | 92.4 | 88.7 | 85.8 |
| MLMOx0151 | 159.3 | 12.1 | 92.2 | 88.4 | 85.5 |

The morphology (BET, particle size) of all samples was basically identical. Ca addition is most effective to lower the base content. 1000 ppm Sr reduce the base content about the same, but less than 400 ppm Ca. However, Sr is interesting because it reduces the base and at the same time the electrochemical properties deteriorate less than for 400 ppm Ca addition.

The Examples illustrating the high crystallinity (Ex. 1 and) show that the skilled man learns in this invention that, for a given composition, expressed in terms of Li:M ratio, it is the sintering temperature that determines the crystallinity of the obtained oxide. A small number of tests enables him to select the correct temperature in order to obtain a material having an X-ray diffraction peak at 44.5°, and preferably also at 18.6°, with a FWHM value less than or equal to 0.1°. The skilled man has to:

- select the composition of the final product and prepare the corresponding quantities of M- and Li-precursors,
- perform a number of sintering steps at different temperatures above 900° C., for example at intervals of 20° C. between 920° and 1000° C., to prepare samples of the final lithium transition metal oxides,
- plot the FWHM values of the peaks of an X-ray diffraction pattern against the degrees for each of the samples,
- determine the sintering temperature yielding FWHM values less than or equal to 0.1° for the diffraction peak at 44.5°, and preferably also at 18.6°.

The invention claimed is:

1. A powderous lithium transition metal oxide having a layered crystal structure $Li_{1+a}M_{1-a}O_{2\pm b}M'_k S_m$ with $-0.03<a<0.06$, $b\approx0$, and $0\leq m\leq 0.6$, m being expressed in mol %, wherein M is a transition metal compound, comprising at least 95% of one or more elements selected from the group con-

TABLE 5A

Preparation and morphology of samples with Sr, Ca addition

| Li-M-oxide, $Ni_{0.38}Mn_{0.33}Co_{0.28}$ | Slurry doping by | BET m²/g | ICP Ca, Sr ppm | Base µmol/g | Vol Å³ | Size nm | D5 µm | D50 µm | D95 µm |
|---|---|---|---|---|---|---|---|---|---|
| LNMnCD0555 | Reference | 0.50 | <100 | ≅50 | 33.7348 | 336 | | | |
| MLMOx0149 | Sr, 400 ppm | 0.52 | 349 | 42.9 | 33.6910 | 332 | 5.14 | 8.99 | 15.3 |
| MLMOx0150 | Sr, 1000 ppm | 0.50 | 832 | 37.6 | 33.6891 | 320 | 5.13 | 8.97 | 15.2 |
| MLMOx0151 | Ca, 400 ppm | 0.49 | 425 | 34.3 | 33.6078 | 319 | 5.14 | 8.98 | 15.3 | sisting of Ni, Mn, Co and Ti; wherein the powderous lithium transition metal oxide is a solid state solution and wherein M' is present on the surface of the powderous oxide and comprises one or more elements selected from the group consisting of Ca, Sr, Y, La, Ce and Zr; and wherein either k=0 and M=$Ni_{1-c-d}Mn_cCo_d$, with 0<c<1, and 0<d<1; or 0.015<k<0.15, k being expressed in wt % of said lithium transition metal oxide; wherein for said powderous oxide, the X-ray diffraction peak at 44.5±0.3 degree, having as index 104, measured with K alpha radiation, has an FWHM value of ≦0.1 degree.

2. The powderous lithium transition metal oxide of claim 1, wherein the X-ray diffraction peak at 18.6±0.2 degree, having as index 003, also has an FWHM value of ≦0.1 degree.

3. The powderous lithium transition metal oxide of claim 1, wherein 0.15<m≦0.6, m being expressed in mol %.

4. The powderous lithium transition metal oxide of claim 1, wherein 0.0250<k≦0.1 in wt %.

5. The powderous lithium transition metal oxide of claim 1, wherein M' is Ca, with 0.0250≦k≦0.0500, in wt %, and 0.25≦m≦0.6, in mol %.

6. The powderous lithium transition metal oxide of claim 5, wherein k≦0.0400, in wt %.

7. The powderous lithium transition metal oxide of claim 1, wherein 0<k<0.15, k being expressed in wt % of said metal oxide, and M=$Ni_{1-c-d}Mn_cCo_d$, with 0<c<1, and 0<d<1.

8. The powderous lithium transition metal oxide of claim 7, wherein c=d=0.333.

9. A process for improving the crystallinity of the powderous lithium transition metal oxide of claim 1, comprising sintering an M-hydroxide, -oxyhydroxide or carbonate precursor together with a Li precursor, at a sintering temperature T of at least 900° C., for a time t between 1 and 48 hrs, wherein a value for (1+a)/(1−a) is selected between 0.99 and 1.1, and said sintering temperature is selected such that the X-ray diffraction peak of said lithium transition metal oxide at 44.5±0.3 degree, having as index 104, measured with K alpha radiation, has an FWHM value of ≦0.1 degree.

10. The process of claim 9, wherein said sintering temperature is selected such that the X-ray diffraction peak of said lithium transition metal oxide at 18.6±0.2 degree, having as index 003, has an FWHM value of ≦0.1 degree.

11. The process of claim 10, wherein the FWHM value is ≦0.08.

12. The process of claim 9, wherein the sintering temperature is at least 950° C.

13. The process of claim 9, wherein the Li precursor is lithium carbonate.

* * * * *